US011038906B1

(12) United States Patent
Bingham et al.

(10) Patent No.: US 11,038,906 B1
(45) Date of Patent: Jun. 15, 2021

(54) NETWORK THREAT VALIDATION AND MONITORING

(71) Applicant: Level 3 Communications, LLC, Broomfield, CO (US)

(72) Inventors: Skyler J. Bingham, Superior, CO (US); Thomas B. Boatwright, Denver, CO (US); Jeffrey Bickford, Broomfield, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 588 days.

(21) Appl. No.: 15/887,805

(22) Filed: Feb. 2, 2018

Related U.S. Application Data

(60) Provisional application No. 62/454,553, filed on Feb. 3, 2017, provisional application No. 62/486,671, filed on Apr. 18, 2017.

(51) Int. Cl.
| | | |
|---|---|---|
| *G06F 21/00* | (2013.01) | |
| *H04L 29/06* | (2006.01) | |
| *H04L 12/26* | (2006.01) | |
| *G06F 9/455* | (2018.01) | |
| *G06N 20/00* | (2019.01) | |
| *H04L 12/58* | (2006.01) | |

(52) U.S. Cl.
CPC ...... *H04L 63/1425* (2013.01); *G06F 9/45558* (2013.01); *G06N 20/00* (2019.01); *H04L 43/06* (2013.01); *H04L 43/10* (2013.01); *H04L 63/1416* (2013.01); *H04L 63/1441* (2013.01); *H04L 51/02* (2013.01); *H04L 2463/144* (2013.01)

(58) Field of Classification Search
None
See application file for complete search history.

(56) References Cited

U.S. PATENT DOCUMENTS

| | | | | |
|---|---|---|---|---|
| 7,773,540 B1* | 8/2010 | Zatko | ............... | H04L 63/0281 370/254 |
| 8,621,610 B2* | 12/2013 | Oberheide | ............ | H04L 63/145 726/22 |
| 8,695,095 B2* | 4/2014 | Baliga | ............... | H04W 12/0027 726/24 |
| 9,430,646 B1* | 8/2016 | Mushtaq | ............. | H04L 63/1425 |
| 9,565,202 B1* | 2/2017 | Kindlund | ............. | G06F 21/567 |

(Continued)

*Primary Examiner* — Maung T Lwin

(57) ABSTRACT

Methods and systems for identifying threats within a network include collecting network traffic data and providing the network traffic data to a classifier configured to identify patterns within the network traffic data consistent with malicious computing devices. The computing devices identified by the classifier are then validated to confirm whether they are, in fact, malicious. In one implementation, such validation is accomplished by interrogating suspected malicious computing devices with messages according to a particular communication protocol and determining whether corresponding responses received form the malicious computing devices are similarly in accordance with the communication protocol. In certain implementations, after identification and validation of a malicious computing device, an emulated computing device is used to continue communication with the malicious computing device and to log characteristics of such communications to further train the classifier.

17 Claims, 4 Drawing Sheets

(56) References Cited

U.S. PATENT DOCUMENTS

| | | | | |
|---|---|---|---|---|
| 10,165,000 B1* | 12/2018 | Aziz | ............... | H04L 63/1491 |
| 10,432,658 B2* | 10/2019 | Back | ............... | H04L 63/1441 |
| 2010/0281388 A1* | 11/2010 | Kane | ............... | H04L 43/0894 |
| | | | | 715/736 |
| 2014/0096251 A1* | 4/2014 | Doctor | ............ | H04L 63/1408 |
| | | | | 726/23 |
| 2015/0207812 A1* | 7/2015 | Back | ............... | H04L 63/1441 |
| | | | | 726/23 |
| 2017/0013000 A1* | 1/2017 | El-Moussa | ...... | H04L 63/1408 |
| 2017/0223032 A1* | 8/2017 | El-Moussa | ...... | H04L 63/1425 |
| 2017/0250954 A1* | 8/2017 | Jain | ................. | H04L 63/1416 |

* cited by examiner

NETWORK THREAT VALIDATION AND MONITORING

CROSS-REFERENCE TO RELATED APPLICATIONS

This application is related to and claims priority under 35 U.S.C. § 119(e) from U.S. Patent Application No. 62/454,553, filed Feb. 3, 2017, entitled "NETWORK THREAT VALIDATION AND MONITORING," and U.S. Patent Application No. 62/486,671, filed Apr. 18, 2017, entitled "NETWORK THREAT VALIDATION AND MONITORING," both of which are hereby incorporated by reference in their entirety.

TECHNICAL FIELD

Aspects of the present disclosure relate to network security and the automatic detection of computing devices, including computing devices involved in various forms of cyberattacks.

BACKGROUND

Conventional network threat identification and tracking techniques rely on the use of honeypots, malware analysis, and Internet-wide scanning to detect, among other things, malicious activity and malware infections. Although these approaches work well in many cases attackers are continuously attempting to avoid detection, making threat identification, tracking, and nullification an arms race between malware authors, hackers, and other bad actors and the security researchers tasked with ensuring the integrity of networks and network resources.

With these thoughts in mind among others, aspects of the network threat validation and detection methods and systems disclosed herein were conceived.

SUMMARY

In one implementation of the present disclosure, a method for validating a computing device within a network is provided. The method includes obtaining network traffic data corresponding to network traffic including malicious traffic and processing the network traffic data to identify a candidate central server associated with the malicious traffic. The candidate central server is then interrogated to determine whether the candidate central server is a malicious central server coordinating actions of infected computing devices. Interrogating the candidate central server includes transmitting an interrogation message in accordance with a known protocol to the candidate central server, the known protocol being for communication between infected computing devices and malicious central servers, and receiving a response from the candidate central server in response to the interrogation message.

In another implementation of the current disclosure, a system for validating computing devices within a network is provided. The system includes a classification engine and a validation engine. The classification engine processes network traffic data corresponding to network traffic including malicious traffic to identify a candidate central server from the network traffic data. The validation engine then determines if the candidate central server identified by the classification engine is a malicious central server component by interrogating the candidate central server. Interrogating the candidate central server includes transmitting an interrogation message in accordance with a known protocol to the candidate central server, the known protocol being for communication between infected computing devices and malicious central servers, and receiving a response from the candidate central server in response to the interrogation message.

In yet another implementation of the current disclosure, a method of identifying and validating network threats is provided. The method includes obtaining network traffic data corresponding to network traffic including malicious traffic. The network traffic data is then provided to a classifier adapted to identify malicious computing devices within the network based on characteristics of the network traffic data. The classifier then identifies a candidate malicious computing device and a predicted threat type based on the network traffic data. The candidate malicious computing device is then interrogated using a validation engine in order to determine if the candidate malicious computing device is an actual malicious computing device. The interrogation process includes by transmitting an interrogation message to the candidate malicious computing device according to a communication protocol associated with malicious network activity and receiving a corresponding response from the candidate malicious computing device in accordance with the communication protocol.

In another implementation of the current disclosure, a method of monitoring malicious computing devices within a network is provided. The method includes identifying each of a malicious computing device of a computer network and a communication protocol for communicating with the malicious computing device. An emulated computing device is then initiated, the emulated computing device configured to communicate with the malicious computing device using the communication protocol and to log characteristics of a communication in response to at least one of sending the communication to the malicious computing device and receiving the communication from the malicious computing device.

In yet another implementation of the current disclosure, a system is provided for monitoring malicious computing devices within a network. The system includes a computing device including each of a validation and a monitoring engine. The validation engine is configured to identify a malicious computing device within a computer network and a communication protocol for communicating with the malicious computing device. The monitoring engine is configured to coordinate an emulated computing device that is further configured to communicate with the malicious computing device using the communication protocol and to log characteristics of communications exchanged between the emulated computing device and the malicious computing device.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings the like reference characters may refer to the same parts throughout the different views. The drawings depict only typical embodiments of the present disclosure and, therefore, are not to be considered limiting in scope.

DETAILED DESCRIPTION

Figure 1:
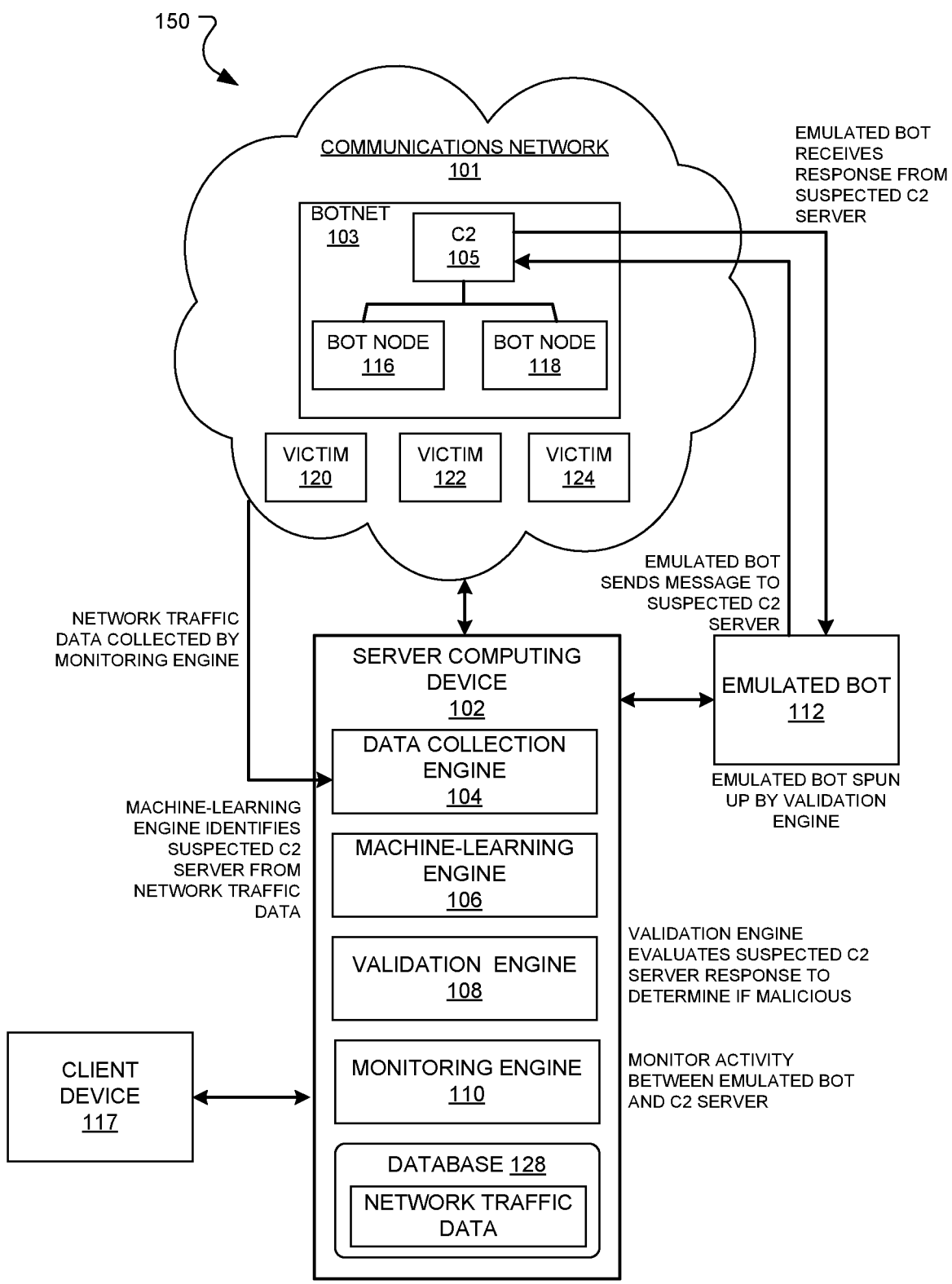
FIG. 1 is a system diagram of an implementation of a network environment for discovering, monitoring, and validating computing devices included in a computing infrastructure.

Aspects of the present disclosure involve methods and systems for automating the discovery, monitoring, and validation of various computing devices that may be compromised or otherwise involved in one or more types of cyberattacks. Such infected computing devices may include, for example, those infected with malware and those that may function as bots within a botnet as well as the command and control servers that issue commands to and coordinate actions of bots within such a botnet. Generally speaking, a botnet represents a number of network-connected computing devices that communicate and coordinate their actions using a command and control infrastructure typically including one or more servers, commonly referred to as command and control servers (individually referred to herein as a "C2 server").

Typically, the computing devices included in a botnet (which are generally referred to as "bots" or "zombies") are infected with malware, allowing the devices to be surreptitiously used in a cyberattack, which may include numerous infected devices. Various network attacks and malicious activities may be initiated through a botnet. For example, the devices and components of the botnet may be used to infiltrate and erode healthy network infrastructure or application systems, illegally obtain confidential information, or commit crimes such as network fraud. As another example, a botnet (and its various devices and components) may be used to launch network attacks such as Distribution Denial of Service (DDoS) attacks, send junk mail, steal proprietary information, abuse network resources, etc. To enable such attacks, the C2 servers issue commands to the bots, causing the bots to use the infected device to attack or perform other malicious activities on other devices of the Internet, or other networks with which the botnet communicates.

Computer and network security organizations are constantly developing ways to counter botnets and other computer threats. However, botnets continue to evolve and become increasingly sophisticated. For example, botnets use various topologies (e.g., star, multi-server, hierarchical, and random) for command and control purposes and for stealth and resiliency purposes, such as to further complicate the discovery of command and control locations.

The system and methods disclosed herein use various mechanisms and classifiers, including those implementing machine-learning algorithms, to process network communication data and traffic to automatically identify suspected malicious computing devices, such as suspected bots and C2 servers of a botnet. Such processing may occur in real time such that new threats can be dynamically identified and addressed. Once the suspected bots/C2 servers have been identified, they are interrogated to determine whether they are, in fact, actual bots/C2 servers or otherwise malicious.

Such interrogating generally includes transmitting a message to the suspected bot/C2 server configured to elicit a known response if the suspected bot/C2 server is an actual bot/C2 server. If such a response is received, the bot/C2 server is identified and remedial steps may be initiated to quarantine or otherwise eliminate the threat presented by the bot/C2 server, such as by blocking traffic sent from the bot/C2 server.

Following identification of malicious computing devices within the network, a validation engine performs additional interrogation to determine whether the candidate computing devices are, in fact, malicious. In general, the interrogation process includes transmitting a command or similar message to the candidate computing device that is configured to elicit a known response if the candidate computing device is, in fact, malicious. For example, in the case of a C2 server, validation may include transmitting a message, such as a heartbeat/timeout message, or a predetermined byte string and receiving, in response, one or more of an attack message or a known prompt based on the byte string provided. If such a message is received, the candidate computing device is considered malicious and various subsequent steps may be taken including, without limitation, generating or otherwise storing a log entry or similar record identifying the malicious computer component and initiating one or more remedial measures, such as updating network device parameters to filter data sent by the candidate computing device, taking down the candidate computing device, and revoking domain name service associated with the candidate computing device. In certain implementations, the outcome of the validation process and the corresponding network data used to identify the candidate computing device may be automatically fed back to the machine-learning mechanism to further refine the classification or other models with which the machine-learning mechanism operates.

The validation process may include instantiating a virtual machine or emulator that mimics the behavior of a compromised computing device but is otherwise controlled and monitored by a known, secure, computing system. Referring again to a botnet, for example, validation may include creating an emulated bot that behaves (e.g., transmits and responds to messages) as if it were an infected computing device. The interrogation messages may then be sent and received through the emulated bot.

After identifying a malicious computing device, the emulated computing device may continue to communicate with the malicious computing device and to generate a log of communications exchanged between the two devices. Such communication may include, among other things, basic heartbeat communications for verifying the communication link between the emulated computing device and the malicious computing device. Communications may also include attack commands received from the malicious computing device. Attack commands may include one or more of a time, a target, a type of attack, specific parameters regarding characteristics of data to be sent during the attack, and other information that may be used to initiate precautionary measures and/or to identify other bots and computing devices receiving commands from the malicious computing device. For example, in certain implementations, systems disclosed herein may automatically implement or modify filters and other network elements to block traffic consistent with the attack command. In certain implementations, network traffic directed to the target may also be monitored to identify other computing devices, such as additional bots of a botnet, under the control of the malicious computing device.

As previously mentioned, certain implementations of the present disclosure may include a machine-learning mechanism to identify potential malicious computing devices. In certain implementations, such a mechanism may be initially trained on network data representing known malicious activity. Based on the training data, the machine-learning mechanism establishes an initial model for identifying compromised or malicious computing devices of a network based on characteristics of messages and data transmitted over the network. After initial training, the machine-learning mechanism is provided real-time or similar actual network data and, in response, the machine-learning mechanism identifies potentially malicious computing devices. In the case of a botnet, for example, the machine-learning mechanism may be trained to identify and locate candidate computing devices that may be operating as C2 servers within a network.

While the present application uses specific examples related to botnets and C2 servers, the various concepts described herein are more generally directed to approaches for identifying and validating threats within a network and taking remedial action to quarantine, eliminate, or otherwise prevent the threats from further compromising or maliciously using network resources. To do so, network traffic data is analyzed using a machine-learning mechanism that identifies potentially compromised or malicious computing devices based on patterns within the network traffic data. Once identified, the candidate computing devices are interrogated by the system by transmitting data and/or messages to the candidate computing devices. The data or messages are generated in accordance with known protocols such that, if the candidate computing device is malicious, the candidate computing device will respond with data or a message having a particular format, content, or other known or predictable characteristics. Accordingly, by modifying the type of network data analyzed and the types of data and messages sent during the validation process, the systems and methods disclosed herein may be readily adapted to address a wide range of cyberattacks including, without limitation, reflectors (e.g, open DNS resolvers, network time protocol (NTP)-related vulnerabilities, portmappers, etc.), phishing attacks, exploit kits, and proxies.

Systems and methods according to this disclosure provide various and significant technical benefits regarding the operation of computer networks. First, such systems and methods improve the overall security and reliability of computer networks by reducing or eliminating threats. The disclosed systems and methods also improve network performance and efficiency by reducing the amount of bandwidth and network resources consumed by such threats. The technical benefits of the systems and methods of the present disclosure also extend to individual computing devices of the network. For example, such systems and methods reduce the likelihood that a computing device will become infected by malware or similar software by reducing or eliminating the sources of such software. Overall performance and efficiency of such computing devices are also improved by reducing that likelihood that resources of such devices will be consumed in carrying out attacks or other tasks on behalf of a nefarious central server.

FIG. 1 is a system diagram of one possible implementation of a network environment 150 for discovering, monitoring, and validating various computing devices included in a computing infrastructure infected with malware, such as bots and C2 servers included in a botnet. As illustrated, the network environment 150 includes a communications network 101, which may be or otherwise include wired and/or wireless portions of the Internet and/or other communications networks, such as wide area networks (WANs) and local area networks (LANs), among others. In one specific example, various computing devices of the communications network 101 may be infected by malicious programs or otherwise include programs that form a botnet 103. In the illustrated embodiment, the botnet 103 includes a C2 server 105 and one or more bot nodes 116-118. As explained above, the botnet 101 may enable various malicious activities to affect and/or otherwise infect other network devices and computing devices located within the communications network 101, illustrated as victims 120-124.

A server computing device 102 functionally connects to the communications network 101 to automatically perform various monitoring and validation functions, including the automatic discovery, validation, and monitoring of C2 servers of a botnet, as described herein with respect to various embodiments. In the illustrated embodiment, the server computing device 102 includes a data collection engine 104, a machine-learning engine 106, a validation engine 108, and a monitoring engine 110.

The data collection engine 104 obtains real-time network traffic data from the communications network 101. For example, in certain implementations, the data collection engine 104 may include an exporter that aggregates packets into flows and exports corresponding records to one or more collectors. The collectors may then receive, store, and pre-process the flow data received from the exporter for future analysis. Information included in the network traffic data may include one or more of an ingress interface, a source IP address, a destination IP address, an IP protocol, a source port, a destination port, the type of IP service In one specific example, the network traffic may be Netflow data. Netflow is a network protocol that enables the collection of network performance data and Internet Protocol traffic data. From the data, useful information such as the destination of traffic (i.e., where traffic is going and coming from), how much traffic is being generated, and class of service information may be determined. Such Netflow data may be captured from the communications network 101. The obtained Netflow data may be stored in a database 128 at the computer server device 102 as real-time Netflow data, or after a certain period, as historic Netflow data.

The stored network traffic data generally provides a history of traffic within the communications network 101 and particular characteristics of that traffic. Accordingly, by analyzing the network traffic data, patterns associated with malicious activity may be identified. For example, the collected network traffic data may indicate that traffic is originating from a particular IP address and being sent to particular destinations at regular intervals. Such traffic may correspond to, among other things, a heartbeat or similar message used in monitoring a botnet or an attack message specifying details for a coordinated attack by the botnet 103 on a potential target, indicating that the originating IP address may likely be associated with a C2 server.

In certain implementations, the machine-learning engine 106 may detect potential/suspected C2 servers in the real-time network traffic (obtained by the data collection engine 104) by applying a classification model to the real-time network traffic data. The classification model, in one example, is generated using machine-learning algorithms trained on an initial set of network traffic data (e.g., historic network traffic representative of bots and C2 servers) that identifies known C2 servers and bots. Stated differently, an initial data set of data identifying known C2 servers may serve as a training set to machine-learning algorithms to generate a classification model, or classifier, that may be executed by the server computing device 102 to predict whether a portion of the real-time network traffic obtained by the data collection engine 104 is indicative of C2 server botnet communications or legitimate network traffic activity.

In one embodiment, the initial data set identifying the known bots and C2 servers may be broken down into one or more features describing known characteristics of known C2 servers. For example, a feature may describe a specific packet size of data that a C2 server typically transmits. A feature may describe the type of Transmission Control Protocol flags a C2 server establishes. A feature may describe what type of device and the specific device with which a known C2 server communicates. For example, a known C2 server may communicate primarily (e.g., 95% of communication) with known bots using known internet protocol addresses (IP addresses). It is contemplated that any number of features may be identified in the initial data set with known bots or known C2 servers. Based on the established features, the machine-learning engine 106 uses one or more machine-learning algorithms to learn the relationship between the features and thereby generate the classification model or classifier. Then, for the system to generate a prediction of whether real-time network traffic data is indicative of a suspected C2 server, the learned classification model is applied to features extracted from the network traffic data captured in by the data collection engine 104.

The validation engine 108 verifies that the suspected C2 server is in fact a functioning C2 server of the botnet 103 by interrogating the suspected C2 server using one or more commands or messages that a known bot of the botnet 103 would typically issue to the C2 server. Depending on the response to the interrogation, the validation engine 108 may generate an indication that the suspected C2 server is likely a C2 server. Alternatively, the validation engine 108 may generate an indication that the suspected C2 server is not a C2 server of the botnet. The validation engine may instead generate an indication of a false-positive and/or of a normal server.

In one specific embodiment, the validation engine 108 may initiate and/or control an emulated computing device configured to emulate a bot or bot type of the botnet 103 and to communicate with the suspected C2 server. More specifically, an emulated bot 112 represents a computing device configured to identify and function like a bot node of the botnet 103. In certain implementations, for example, the emulated bot 112 may be implemented as a virtual machine that is instantiated by the server computing device 102 when the machine-learning engine 106 identifies one or more candidates based on the network traffic data. For example, upon identifying a suspected C2 server, the server computing device 102 may spin up a virtual machine to having characteristics and functionality of the emulated bot 112. In alternative implementations, the emulated bot 112 may instead be executed on a physical server in communication with the server computing device 102. Regardless of the form of the emulated bot 112, the emulated bot 112 is controlled by the server computing device 102 to issue commands to the suspected C2 server. Any response to the commands subsequently received from the suspected C2 server by the emulated bot 112 is provided to the server computing device 102 and processed to determine whether the command is an expected response. If the response is an expected response or a response that the server computing device 102 knows is a valid response of a C2 server of the botnet, then the server computing device 102 generates an indication that the suspected C2 server is a valid or actual C2 server.

In certain cases, the particular type of C2 server, botnet under control of the C2 server, or other type of threat may not be known and, as a result, the particular communication protocol for communicating with suspected malicious computing devices may not be known when initializing the emulated bot 112. In such cases, multiple emulated bots may be initialized, each configured to communicate with the suspected malicious computing device using a different communication protocol. Alternatively, one emulated bot may be adapted to test multiple communication protocols by, for example, changing between communication protocols after a predetermined number of failed communication attempts or a predetermined amount of time without successful communication with the suspected malicious computing device.

As shown in FIG. 1, the server computing device 102 may also be communicatively coupled to a client device 117. In certain implementations, the client device 117 may be used to, among other things, collect and analyze data from the server computing device 102, update or modify classification models of the machine-learning engine 106, and update or modify interrogates issued by the validation engine 108 in response to identifying a candidate central server component. The client device 117 may also be a computing device associated with technical or security support personnel of a network operator such that the server computing device 102 can issue alerts, alarms, tags, reports, or other notifications in response to identifying a central server component or other malicious computing device within the communications network 101.

Although the machine-learning engine 106 provides a powerful method of identifying suspected malicious computing devices for interrogation by the validation engine 108, the validation engine 108 may receive other inputs in addition to or instead of outputs from the machine-learning engine 106. For example, in certain implementations, the validation engine 108 may be directly provided with one or more of an IP address or other location of a suspected malicious computing device, a type of malicious computing device, or other information identifying suspected malicious computing devices within the network 101 for interrogation. As another example, the validation engine 108 may receive an output from the monitoring engine 110 related to communications between the emulated bot 112 and an identified malicious computing device to identify other potential targets for additional interrogation. For example, characteristics of an attack command received by the emulated bot 112 may be used to identify network traffic having similar characteristics and to identify the other malicious computing devices from which the network traffic originated. Information regarding these other malicious computing devices may be provided to the validation engine 108 such that other malicious computing devices (or computing devices in communication therewith) may in turn be targeted for interrogation.

Figure 2:
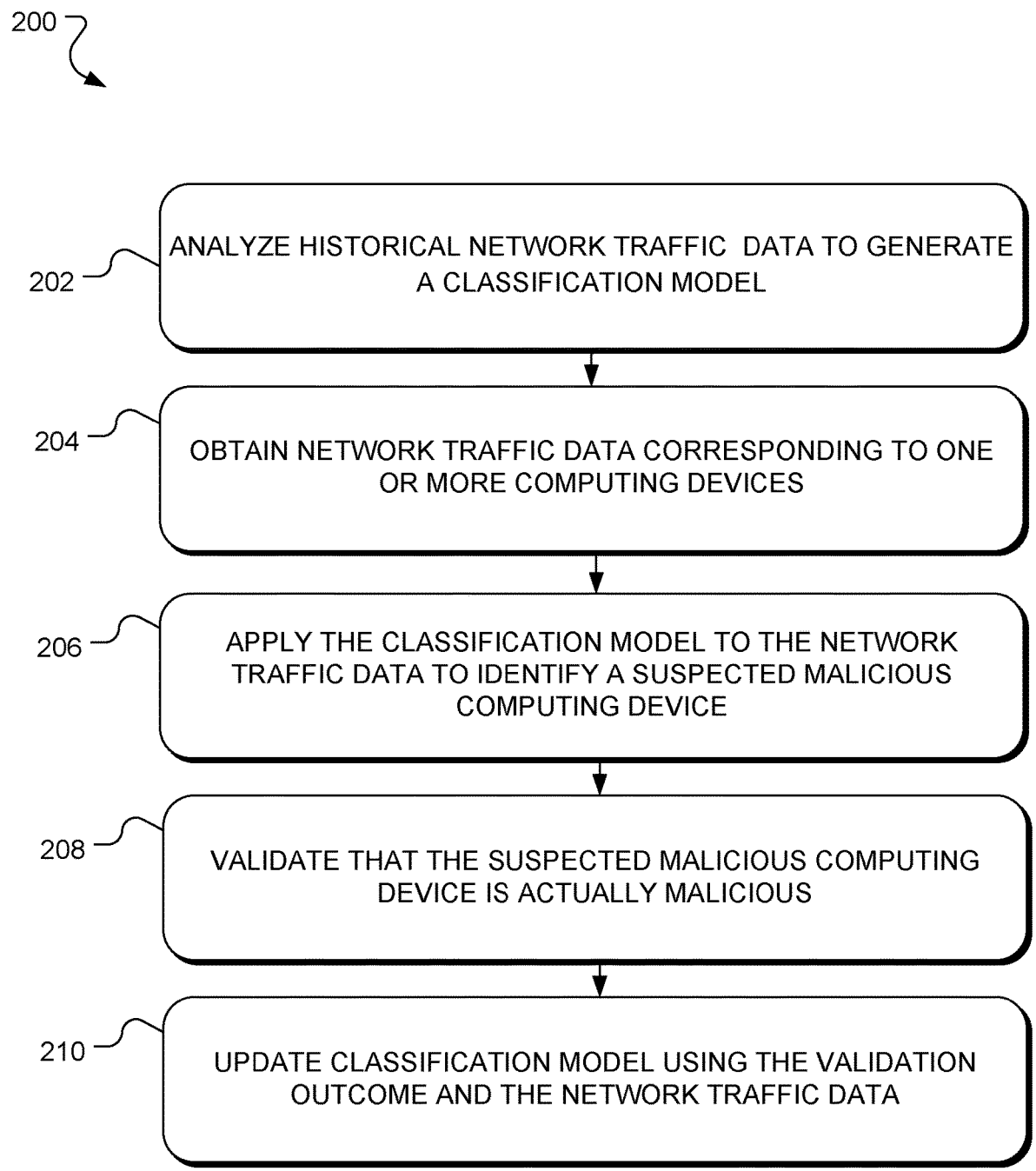
FIG. 2 is a flowchart illustrating a process for discovering, monitoring, and validating various computing devices included in a computing network.

FIG. 2 depicts an example method and/or process for discovering, monitoring, and validating various computing devices in a computing infrastructure that may be infected with malware or otherwise part of malicious activity. Such computing devices may include, but are not limited to, bots or C2 servers included in a botnet.

At 202, an initial, or historic, set of network data may be analyzed to generate a classification model. For example, in certain implementations, the initial or historic set of network data may be Netflow data. Referring to FIG. 1 and in one specific example, the server computing device 102 may process the historic data to generate a classification model capable of predicting whether a server component included in the communications network 101 is suspected of issuing commands to a plurality of computing devices infected with malicious code. Such a classification model may be generated by a machine-learning algorithm or similar mechanism that uses the historic network data as a training data set. Such a training set may include network data or characteristics of network data and an indication as to whether or not such network data or characteristics correspond to an infected computing device or malicious activity. With respect to a botnet, the classification model generally predicts whether the network traffic corresponds to a C2 server of a botnet or is otherwise indicative of the presence of a suspected C2 server functioning within the botnet 103. Referring to FIG. 1, the resulting classification model may be incorporated into the machine learning engine 106 used to identify suspected malicious computing devices from network traffic. In other implementations, the classification model may instead be implemented as a non-machine learning engine within which the classification model is implemented as an algorithm or similar series of logical tests that may be applied to the network traffic.

At 204, network traffic data corresponding to one or more computing devices is obtained for analysis and, more specifically, for analysis as to whether the network traffic data is indicative of any particular malicious activity. Such network traffic may be obtained in real-time and/or may include previously collected and stored network data. Referring to FIG. 1, for example, a data collection engine 104 may be implemented to collect and store network traffic data in a database 128. In certain implementations, the total amount of network traffic exchanged over the network 101 may be significant and, as a result, collecting data associated with all network traffic may be inefficient, expensive, or impractical. Accordingly, in certain implementations, network traffic data may be monitored and corresponding traffic data collected for a subnetwork of a broader network. For example, one or more computing devices may be identified or otherwise suspected as being compromised by malicious code based on reduced performance, unanticipated activity, or other signs of an infection. IP or other addresses with which the infected computing devices communicates may then be identified (up to a predetermined depth), thereby mapping out a subnetwork that may include other infected computing devices and/or command and control or similar servers. Network traffic data may then be collected for the subnetwork originating from the infected computing device. In still other implementations, the data collection engine 104 may be provided with one or more specific network devices from which to collect associated network traffic data.

Referring again to FIG. 1, the data collection engine 104 may obtain network traffic data from the communications network 101. In one specific example, the data collection engine 104 may parse and identify data packets belonging to the same network traffic (e.g., defined by a source IP address and a destination IP address) to obtain data for a suspected central server component included in the communications network 101. In the specific example of a botnet, the network traffic may correspond to a suspected C2 server issuing commands and controlling the actions of the bot nodes 116-118.

At 206, the generated classification model is applied to the network traffic data to identify a candidate central server component from the communications network that is suspected of issuing commands to computing devices infected with malicious code (or that are suspected as being infected with malicious code). In the botnet example, the network traffic may be applied to the classification model to determine whether a particular device is a C2 server.

At 208, each suspected malicious computing device identified by applying the classification model is validated to ensure that the suspected malicious computing device is, in fact, malicious, such as by issuing commands to other components infected with malicious code if the malicious computing device is suspected of being a central server component. With reference to FIG. 1 and referring to the botnet example, a validation engine 108 of the server computing device 102 may initiate and generally manage such a validation process. In certain implementations, the validation engine 108 may, for example, initialize the emulated bot 112 and direct communication between the emulated bot 112 and the suspected C2 server 105. In particular, the validation engine 108 may direct the emulated bot 112 to interrogate the suspected C2 server 105 with messages according to a predetermined protocol corresponding to a suspected type of botnet, malware, etc. of the suspected C2 server 105. The emulated bot 112 may forward any responses it receives to the validation engine 108 for analysis. To the extent the responses match expected response of the suspected type of botnet/malware, the validation engine 108 may indicate that the suspected C2 server 105 is a true functioning C2 server. Alternatively, the validation engine 108 may generate an indication that the suspected C2 server of the botnet 101 is not a functioning C2 server of the botnet.

In certain implementations, multiple emulated bots may be initialized by the validation engine, each of the emulated bots configured to communicate with the suspected malicious computing device using a different protocol. By doing so, the suspected malicious computing device may be simultaneously interrogated using multiple protocols, thereby improving the efficiency with which the suspected malicious computing device may be validated. In other implementations, an emulated bot may be configured to change between communication protocols after various conditions including, without limitation, a predetermined number of failed communication attempts with the suspected malicious computing device using a particular protocol or a predetermined time using a particular protocol.

At 210, the outcome of the validation process may be fed back to improve the classification model. For example, network traffic data to which the classification model was applied at 206 and the indication provided by the validation model 108 at 208 may be used as new training data for the classification model or other machine-learning algorithm used to identify suspected malicious computing devices. For example, if the suspected malicious computing device is validated, the network traffic data used to make such a determination is associated with a positive outcome and is used to provide positive feedback to the classification model. Alternatively, if the suspected malicious computing device is not validated (e.g., an expected communication is not received from the suspected malicious computing device), the captured real-time network traffic data is associated with a negative outcome and is used to provide negative feedback to the classification model. Referring to the botnet example, given the dynamic nature of botnets, the machine-learning engine 104 may continuously refine the classification model over time, by training the classification model using continually updated data resulting from the validation process. In this regard, the classifier is re-trained and the classification model is continuously refined using network traffic data to ensure the server computing device 102 can detect changing botnet behavior.

The server computing device 102 may be further configured to initiate various other operations in response to validation of a candidate central server or similar malicious computing device. In certain implementations, for example, the server computing device 102 may log or otherwise record one or more of the computing devices identified by the machine-learning mechanism, the computing devices interrogated by the validation engine 108, and the outcomes of interrogation conducted by the validation engine 108.

The server computing device 102 may also initiate various remedial measures in order to address the identified threat. In certain implementations, for example, the server computing device 102 may be configured to generate a report, an alert, an alarm, a tag, or any other notification that may be transmitted to another computing device, such as the client computing device 110. In other implementations, the server computing device 102 may automatically deploy executable code or issue commands to reconfigure or otherwise modify equipment within the communications network 101. For example, the server computing device 102 may send commands to a switch, a firewall, or a similar network component that causes the network component to be reconfigured to filter out or otherwise block network traffic associated with the validated central server component. The server computing device 102 may also deploy or otherwise initiate deployment of executable code, such as patches, to update computing devices within the communication network 101. Such executable code may, for example, cause the computing devices to initiate malware/virus removal operations or close security vulnerabilities of certain software or firmware of the computing devices.

Figure 3:
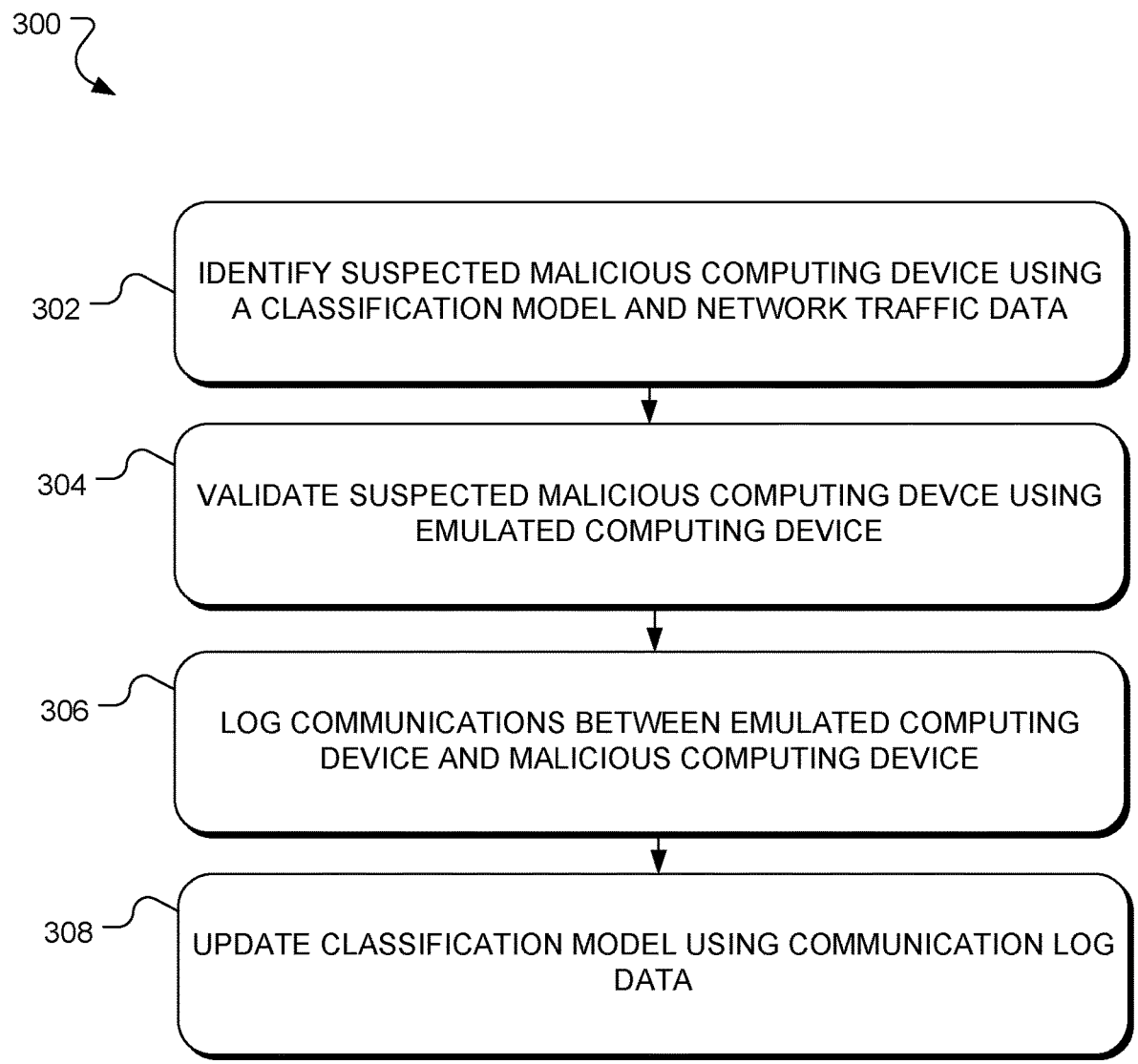
FIG. 3 is a flowchart illustrating a method of identifying and monitoring a malicious computing device.

FIG. 3 is a flowchart illustrating a method of monitoring malicious activity with a network, such as the network 101 of FIG. 1. At step 302 a suspected malicious computing device is identified by applying a classification model to network traffic data. As previously discussed in the context of the flowchart 200 of FIG. 2, the classification model may be generated, for example, using historic network traffic data and may further include the application of a machine-learning algorithm. Accordingly, the process of identifying a suspected malicious computing device generally includes applying the classification model to real-time and/or previously collected network traffic data to identify potential threats within the network-of-interest or a subnetwork thereof.

At step 304, the suspected malicious computing devices is validated using an emulated computing device, such as an emulated bot. As previously described in the context of step 208 of FIG. 2, the process of validating a suspected malicious computing device may generally include initializing an emulated computing device configured to communicate with the suspected malicious computing device using a particular communication protocol. In general, validation may include transmitting data or messages to the suspected malicious computing device and receiving a corresponding response. In certain implementations, the validation process may include determining the appropriate communication protocol. To do so, multiple emulated computing devices may be initialized, each using a different protocol or an emulated computing device may be configured to attempt various protocols until a successful response is received.

After communication has been established between the emulated computing device and the now-confirmed malicious computing device, the emulated computing device may continue to communicate with the malicious computing device. Although other recording methods may be used, at 306, the emulated computing device generates a log of such communications with the malicious computing device. The log may store any information related to the communications with the malicious computing device including, without limitation, information related to the contents and timing of when the communications were received. For example, in certain implementations, the log may include a timestamp for when a communication was sent or received by the emulated computing device, an indicator corresponding to the type of message received (e.g., heartbeat, attack instructions, etc.), and any specific instructions that may be included in the message. Such instructions may include, among other things, a time at which an attack is to occur, a target of the attack, a type of attack, and other parameters for the attack, such as the size of packets to be sent if the attack is a DDoS attack or the content of messages to be sent in the case of a spambot.

At 308, the classification model used to identify suspected malicious computing devices may be updated with information collected in the log by the emulated computing device. In particular, because the logged communications represent network traffic data associated with a malicious computing device/threat, the contents of the log may be used as additional inputs and/or training data to further refine the classification model's ability to identify potentially malicious traffic from collected network traffic data.

In certain implementations, the log information may be used more directly to identify additional malicious or potentially malicious computing devices within a network. For example, the log may include instructions regarding an attack, such as a DDoS attack, that had been previously carried out. The logged information may include, among other things, a target of the attack, a date/time of the attack, and/or characteristics of the attack, such as the size or type of packets to be sent to the target. Accordingly, collected network traffic data may be analyzed using the specified date/time, the target, and the characteristics to identify other traffic associated with the attack. The source of such traffic may then be identified, thereby providing additional nodes/bots in the botnet responsible for the DDoS attack. Remedial actions may then be taken with regards to these bots and/or additional monitoring of the bots may be initiated to obtain further information regarding the botnet. In certain implementations, an emulated bot in communication with a known malicious computing device may also be used to preempt or otherwise mitigate a future attack. For example, the information contained in an attack message for a future attack may be used to preemptively reconfigure network equipment (such as filters, firewalls, and similar equipment) to filter out, quarantine, redirect, or otherwise mitigate the potential of the attack. In certain implementations, the preemptive measures may include one or more of deploying an update to one of the target and a computing device associated with the target, updating a filter associated with the target, generating and transmitting one or more of a report, an alert message, and an alarm, and modifying a configuration of a network device in communication with the target such that the network device modifies data/messages sent to the target that are in accordance with the attack message sent to the target.

Figure 4:
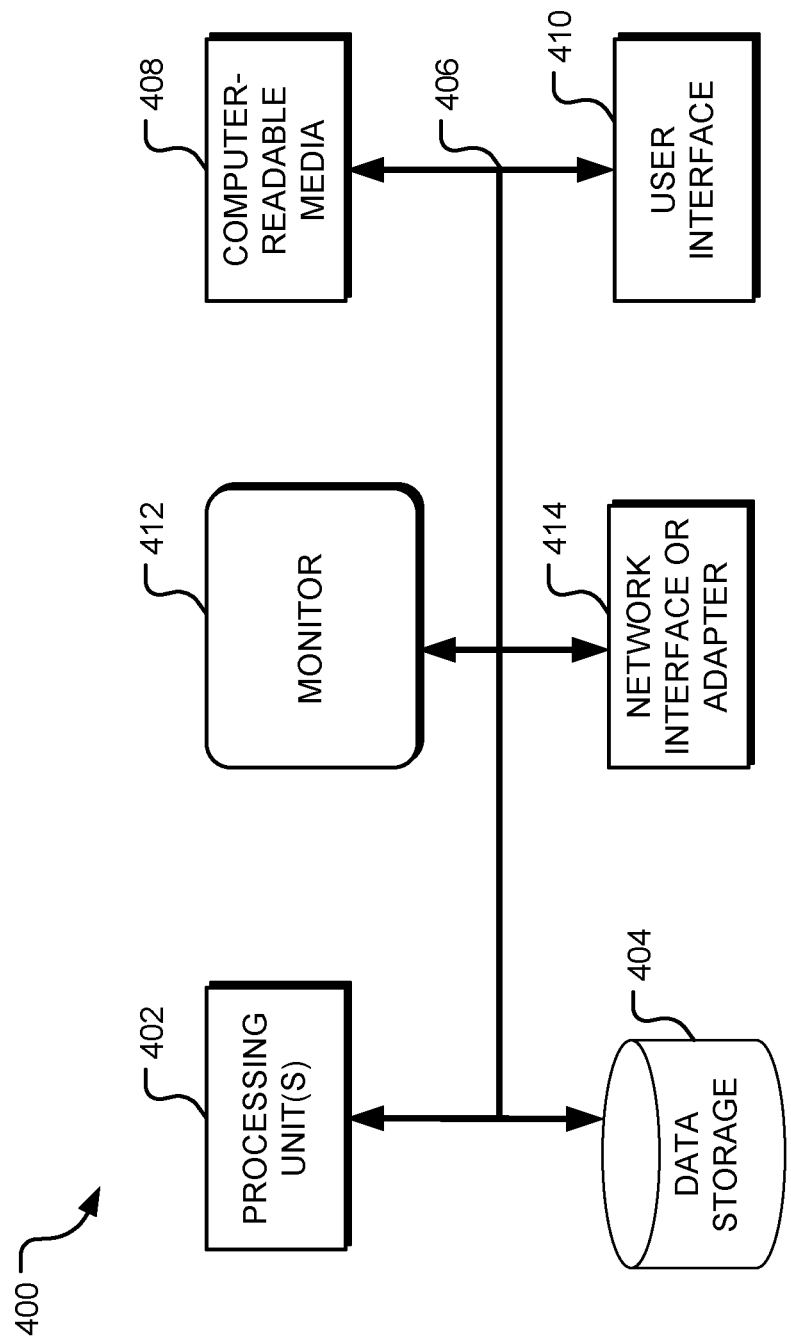
FIG. 4 is a block diagram illustrating a computing device that may be specially designed and configured for the specific purpose of discovering, monitoring, and validating various computing devices included in a computing.

FIG. 4 illustrates an example of a suitable computing and networking environment 400 that may be specifically designed and configured to implement various aspects of the present disclosure described in FIGS. 1-3, such as the server computing device 102. As illustrated, the computing and networking environment 400 includes a general purpose computing device 400, although it is contemplated that the networking environment 400 may include one or more other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 400 may include various hardware components, such as a processing unit 402, a data storage 404 (e.g., a system memory), and a system bus 406 that couples various system components of the computer 400 to the processing unit 402. The system bus 406 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 400 may further include a variety of computer-readable media 408 that includes removable/non-removable media and volatile/nonvolatile media, but excludes transitory propagated signals. Computer-readable media 408 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computer 400. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 404 includes computer storage media in the form of volatile/nonvolatile memory such as read only memory (ROM) and random access memory (RAM). A basic input/output system (BIOS), containing the basic routines that help to transfer information between elements within the computer 400 (e.g., during start-up) is typically stored in ROM. RAM typically contains data and/or program modules that are immediately accessible to and/or presently being operated on by processing unit 402. For example, in one embodiment, data storage 404 holds an operating system, application programs, and other program modules and program data.

Data storage 404 may also include other removable/non-removable, volatile/nonvolatile computer storage media. For example, data storage 404 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 4, provide storage of computer-readable instructions, data structures, program modules and other data for the computer 400.

A user may enter commands and information through a user interface 410 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 402 through a user interface 410 that is coupled to the system bus 406, but may be connected by other interface and bus structures, such as a parallel port, game port or a universal serial bus (USB). A monitor 412 or other type of display device is also connected to the system bus 406 via an interface, such as a video interface. The monitor 412 may also be integrated with a touch-screen panel or the like.

The computer 400 may operate in a networked or cloud-computing environment using logical connections of a network interface or adapter 414 to one or more remote devices, such as a remote computer. The remote computer may be a personal computer, a server, a router, a network PC, a peer device or other common network node, and typically includes many or all of the elements described above relative to the computer 400. The logical connections depicted in FIG. 4 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 400 may be connected to a public and/or private network through the network interface or adapter 414. In such embodiments, a modem or other means for establishing communications over the network is connected to the system bus 406 via the network interface or adapter 414 or other appropriate mechanism. A wireless networking component including an interface and antenna may be coupled through a suitable device such as an access point or peer computer to a network. In a networked environment, program modules depicted relative to the computer 400, or portions thereof, may be stored in the remote memory storage device.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method for validating a candidate central server as malicious within a network comprising:
   obtaining network traffic data corresponding to network traffic including malicious traffic;
   processing the network traffic data to identify the candidate central server as associated with the malicious traffic; and
   interrogating the candidate central server to determine whether the candidate central server is a malicious central server coordinating actions of infected computing devices,
   wherein interrogating the candidate central server comprises:
   initializing a plurality of emulated computing devices, where each emulated computing device is configured to communicate with one of a plurality of particular communication protocols;
   transmitting, by each emulated computing device of the plurality of emulated computing devices, an interrogation message to the candidate central server using the associated particular communication protocol; and
   receiving, from the candidate central server, a response to the interrogation message by one of the plurality of emulated computing devices, and wherein
   the associated particular communication protocol used by the one of the plurality of emulated computing devices is a known protocol for communication between infected computing devices and malicious central servers.

2. The method of claim 1, wherein interrogating the candidate central server further comprises determining the candidate central server is the malicious central server if the response is in accordance with the known protocol.

3. The method of claim 2, further comprising identifying one infected computing device of the infected computing devices in communication with the candidate central server from the network traffic data, wherein identifying the one infected computing device comprises identifying at least one of a source and a destination of network traffic associated with the malicious central server.

4. The method of claim 3, wherein the malicious central server is a command and control server of a botnet and the infected computing device is a bot of the botnet.

5. The method of claim 2 further comprising, after determining the candidate central server is the malicious central server, generating a log including entries for at least one of communications sent to the malicious central server and communications received from the malicious central server.

6. The method of claim 2, further comprising, in response to determining the candidate central server is the malicious central server, performing a remedial operation, the remedial operation including one or more of:
   deploying an update to a computing device associated with the network traffic;
   updating a filter in communication with the candidate central server;
   generating and transmitting one or more of a report, an alert message, and an alarm; and
   modifying a configuration of a network device in communication with the candidate central server such that the network device modifies data sent to or received from the central server component.

7. The method of claim 1, wherein interrogating the candidate central server further comprises determining the candidate central server is not the malicious central server if the response is not in accordance with the known protocol.

8. The method of claim 1, wherein processing the network traffic data comprises processing the network traffic data using a machine-learning based classification model.

9. The method of claim 8 further comprising training the machine-learning based classification model using the network traffic data and an outcome of the interrogating.

10. The method of claim 8, wherein the machine-learning based classification model is initially trained with historical network traffic data identifying one or more known and verified malicious computing devices.

11. The method of claim 1, wherein the emulated computing device is a virtual machine spun up in response to identifying the candidate central server associated with the malicious traffic.

12. A system for validating a candidate central server as malicious within a network comprising:
   a computing device comprising:
   a classification engine configured to process network traffic data corresponding to network traffic including malicious traffic and to identify the candidate central server component from the network traffic data; and
   a validation engine configured to interrogate the candidate central server to determine whether the candidate central server is a malicious central server coordinating actions of infected computing devices, wherein interrogating the candidate central server includes:
   initializing a plurality of emulated computing devices, where each emulated computing device is configured to communicate with one of a plurality of particular communication protocols;
   transmitting, by each emulated computing device of the plurality of emulated computing devices, an interrogation message to the candidate central server using the associated particular communication protocol; and
   receiving, from the candidate central server, a response to the interrogation message by one of the plurality of emulated computing devices, wherein
   the associated particular communication protocol used by the one of the plurality of emulated computing devices is a known protocol for communication between infected computing devices and malicious central servers.

13. The system of claim 12, wherein the emulated computing device is a virtual machine and the validation engine is configured to spin up the emulated computing device in response to the classification engine identifying the candidate central server associated with the malicious traffic.

14. The system of claim 12, wherein the classification engine is a machine-learning based classification engine trained using at least one of historic network traffic data associated with known malicious computing devices and the network traffic data processed by the classification engine and corresponding results from the validation engine.

15. A method of identifying and validating network threats comprising:
   obtaining, using a computing device, network traffic data corresponding to network traffic including malicious traffic;
   providing the network traffic data to a classifier of the computing device, the classifier adapted to identify malicious computing devices within the network based on characteristics of the network traffic data;

identifying, using the classifier, a candidate malicious computing device based on the network traffic data; and interrogating, using a validation engine of the computing device, the candidate malicious computing device to determine whether the candidate malicious computing device is an actual malicious computing device, wherein interrogating the candidate malicious computing device comprises:

instantiating a plurality of emulated computing devices, where each emulated computing device is configured to communicate with one of a plurality of particular communication protocols;

transmitting, by each emulated computing device of the plurality of emulated computing devices, an interrogation message to the candidate malicious computing device using the associated particular communication protocol; and receiving, from the candidate malicious computing device, a response to the interrogation message by one of the plurality of emulated computing devices, wherein the associated particular communication protocol used by the one of the plurality of emulated computing devices is a known protocol for communication between infected computing devices and malicious central servers.

16. The method of claim 15 further comprising training the classifier using the network traffic data and an outcome of the interrogating based on the network traffic data.

17. The method of claim 15, wherein the interrogation message is one of a plurality of interrogation messages, each of the plurality of interrogation messages in accordance with a respective communication protocol.

* * * * *